US006294588B1

(12) United States Patent
Chou et al.

(10) Patent No.: US 6,294,588 B1
(45) Date of Patent: Sep. 25, 2001

(54) SUPERABSORBING FIBERS AND FILMS AND PROCESSES FOR PREPARING SAME

(75) Inventors: Yueting Chou, Chesterfield; Timothy Paul Feast, Wildwood; Jingen Zhang, Maryland Heights, all of MO (US); David Sikora, Middlebury, CT (US)

(73) Assignee: Solutia Inc., St. Louis, MO (US)

( * ) Notice: Subject to any disclaimer, the term of this patent is extended or adjusted under 35 U.S.C. 154(b) by 0 days.

(21) Appl. No.: 09/433,268

(22) Filed: Nov. 3, 1999

Related U.S. Application Data

(62) Division of application No. 09/191,857, filed on Nov. 12, 1998, now Pat. No. 5,997,791.
(60) Provisional application No. 60/065,849, filed on Nov. 4, 1997.

(51) Int. Cl.$^7$ .............................. D01D 5/12; C07D 243/00; C08J 9/36
(52) U.S. Cl. ............................ 521/64; 521/183; 521/184; 521/189; 528/322; 528/328; 528/363; 528/480; 528/482
(58) Field of Search ............................... 521/64, 183, 184, 521/189; 528/322, 328, 363, 480, 482

(56) References Cited

U.S. PATENT DOCUMENTS

| 3,846,380 | | 11/1974 | Fujimoto et al. | 260/78 |
|---|---|---|---|---|
| 4,855,179 | | 8/1989 | Bourland et al. | 428/296 |
| 4,874,655 | | 10/1989 | Fujimoto et al. | 428/198 |
| 5,057,597 | | 10/1991 | Koskan et al. | 528/328 |
| 5,142,062 | | 8/1992 | Knebel | 548/545 |
| 5,315,010 | | 5/1994 | Koskan et al. | 548/520 |
| 5,319,145 | | 6/1994 | Paik et al. | 528/328 |
| 5,461,085 | * | 10/1995 | Nagatomo et al. | 521/183 |
| 5,478,919 | | 12/1995 | Koskan et al. | 528/363 |
| 5,484,945 | | 1/1996 | Nagatomo et al. | 548/520 |
| 5,525,682 | | 6/1996 | Nagatomo et al. | 525/420 |
| 5,525,703 | | 6/1996 | Kalota | 528/363 |
| 5,612,384 | * | 3/1997 | Ross et al. | 521/64 |
| 5,859,179 | * | 1/1999 | Chou | 528/428 |

FOREIGN PATENT DOCUMENTS 0658586   6/1995 (EP) .

* cited by examiner

*Primary Examiner*—Morton Foelak
(74) *Attorney, Agent, or Firm*—Thompson Coburn LLP; Gregory Upchurch; Paul A. Lesko

(57) ABSTRACT

Superabsorbent fiber and film compositions comprising partially acidified, hydrolyzed, internally plasticized, crosslinked, superabsorbing fibers or film derived from polysuccinimide and processes for preparing same.

14 Claims, No Drawings

SUPERABSORBING FIBERS AND FILMS AND PROCESSES FOR PREPARING SAME

This patent application is a division of U.S. patent application Ser. No. 09/191,857 filed Nov. 12, 1998, now U.S. Pat. No. 5,997,791, which claims the benefit of priority under 35 U.S.C. § 119(e) of U.S. Provisional Application No. 60/065,849 filed Nov. 14, 1997, both of which are incorporated herein in their entirety by reference.

BACKGROUND OF THE INVENTION

This invention relates to superabsorbing polymers based on L-aspartic acid in synthetic fiber and film forms and to process(es) for preparing such fibers and films.

Polysuccinimide (PSI) is prepared by thermal polycondensation of L-aspartic acid which can then be base-hydrolyzed to polyaspartate salt which has many industrial uses such as lubricant in metalworking fluids. Crosslinking PSI before or after hydrolysis renders the hydrolyzed salt superabsorbent in that it can absorb many times its weight of liquid such as water. This capability of absorbing significant quantities of fluids, including body exudates and aqueous compositions of all kinds, creates another important class of application for these polymers in products such as diapers, sanitary napkins, incontinence products, towels, tissues and the like. These superabsorbing polymers are in the prior art as typically disclosed in U.S. Pat. No. 5,461,085 (Nagatomo et al); U.S. Pat. No. 5,525,703 (Kalota) and U.S. Pat. No. 5,612,384 (Ross et al). Though articles of superabsorbing polymers derived from L-aspartic acid are recognized in this art as desirable, to date they are only disclosed in unshaped, particulate form as recovered from the hydrolysis step forming the salt. Note all the examples of the patents referenced above. Continued absence in the art of these polymers in fiber or film form is likely due to the important conflicting requirements of being sufficiently plastically extensible to permit drawing fiber or forming film while being crosslinked and hydrolyzed to create superabsorbency.

In view of the noted applications, it would be highly desirable to provide biodegradable superabsorbent polymers derived from L-aspartic acid in fiber or film form to facilitate formation into products such as diapers and the like.

The superabsorbent fibers and films of the present invention provide a solution to many problems encountered with unshaped, particulate superabsorbent polymers derived from L-aspartic acid. For example, the superabsorbent fibers of the invention have the advantages of (1) avoiding the problem of migration by having the ability to entangle with fluff pulp fibers, (2) being compatible with other fibers resulting in greater flexibility in applications and fabrication, and (3) having a large surface area resulting in a faster absorption rate. For example, the superabsorbent films of the invention have the advantage of avoiding the problem of migration by having the ability to remain stationary within an article containing the film.

SUMMARY OF THE INVENTION

Now, significant developments have been made in producing superabsorbent polymer fibers and films derived from L-aspartic acid.

Accordingly, a principal object of this invention is to produce synthetic, superabsorbent fibers and films of L-aspartic acid derivatives.

Another object is to provide a method for producing such fibers or films.

A further object is to chemically modify PSI to render it capable of drawing into fiber or forming film.

Yet another object is to provide an intermediate precursor for production of fibers or films based on PSI prepared from L-aspartic acid.

Other objects will in part be obvious and will in part appear from the following detailed description.

These and other objects are accomplished by the following multiple aspects of the invention.

i) A fiber- or film-forming plastic composition must be sufficiently plastically extensible to permit forming into film or drawing into a filament-like shape without fracture. It is difficult to draw fibers or form films from crosslinked and hydrolyzed PSI which has not been further modified. This problem is remedied by one aspect of the invention by forming an uncrosslinked, non-hydrolyzed, internally plasticized poly(imide-co-amide) intermediate precursor which is useful in later forming such superabsorbing polymeric fibers or films. The intermediate is prepared by reacting a regulated amount of about 1 to about 20% of succinimide groups of the PSI with a minor, internally plasticizing amount of one or more monoamine compounds, such as diethanolamine. The partial amidation with the monoamine compound softens the polymer and facilitates subsequent drawing into fiber form or forming into film. For example, the poly(imide-co-amide) intermediate produced using diethanolamine as the monoamine compound has repeating structural units represented by formula (1)

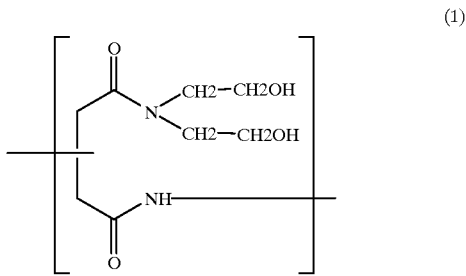

and repeating structural units represented by formula (2)

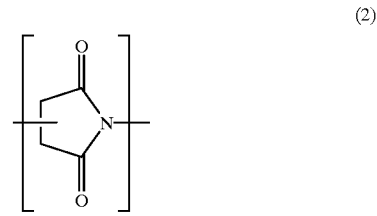

the mole fraction of repeating structural units represented by the formula (1) being about 0.01 to about 0.20.

ii) The internally plasticized poly(imide-co-amide) intermediate is subsequently hydrolyzed to convert essentially all of the succinimide groups into aspartate groups. A portion of the aspartate groups in the polyamide produced as a result of the hydrolysis are then partially acidified to produce a partially acidified, hydrolyzed, internally plasticized polysuccinimide composition.

iii) Since fiber- or film-forming polymer cannot be effectively drawn or formed when crosslinked, another aspect of the invention incorporates crosslinking agent into the partially acidified, hydrolyzed, internally plasticized polysuccinimide composition before shaping fiber or film from the crosslinkable but uncrosslinked intermediate composition. Crosslinking aspartate groups of the polymer occurs after fiber or film formation in an after-treating or curing step by subjecting the fibers or film to crosslinking conditions to render them capable of superabsorbing. Premature crosslinking is minimized or avoided by incorporating heat reactive crosslinking agents into the composition at low temperature, i.e. from or about 0° C. to or about 25° C.

iv) Products of the process differ from those previously known in that the superabsorbing polymer is importantly in fiber or film form. The crosslinked fibers or film are of polyamide containing at least three divalent or polyvalent moieties randomly distributed along the polymer chain having the following formulas:

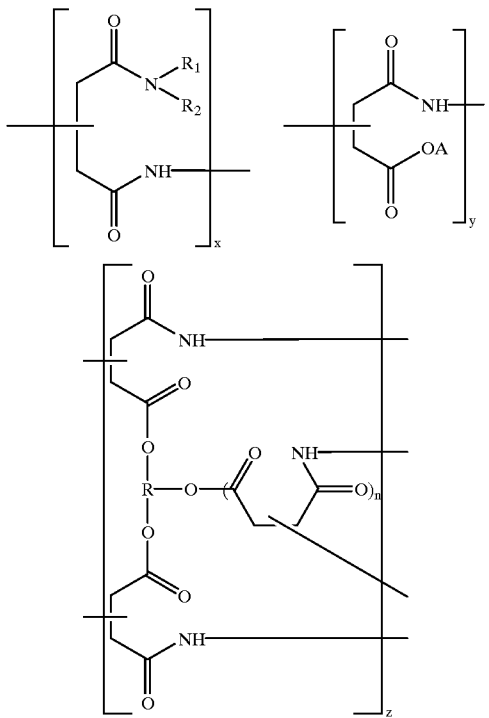

where A represents hydrogen, alkali metal cation, ammonium, quaternary ammonium or mixtures thereof, R represents a divalent or polyvalent crosslinker moiety, x, y and z represent mole fractions of the moieties in the polyamide and are respectively about 0.01 to 0.20; about 0.40 to 0.90 and about 0.01 to 0.50 wherein the sum of x, y and z is 1.0, and n is an integer from 0 to 4. $R_1$ and $R_2$ are substituents on the monoamine compound used for the internal plasticization of PSI and can be the same or different. Optionally, the superabsorbent polymer contains minor amounts of unreacted succinimide repeating units, i.e. repeating unit disclosed in formula (2) above, and unreacted acidified aspartate repeating units, i.e. repeating unit disclosed in formula (4) herein. As used herein, a minor amount of succinimide repeating units or acidified aspartate repeating units is an amount up to that amount which has a detrimental effect on the absorbency properties of the superabsorbent fiber or film.

v) In a specific aspect of the invention, a process is provided for preparing superabsorbing fibers or film which comprises the following steps in the recited sequence:

i) condensation polymerizing L-aspartic acid to form polysuccinimide (PSI) having a weight average molecular weight of at least about 20,000 Daltons;

ii) reacting about 1 to about 20% of the succinimide groups of the PSI with one or more monoamine compounds to form an internally plasticized poly(imide-co-amide) intermediate;

iii) hydrolyzing essentially all of the succinimide groups of the poly(imide-co-amide) to form an internally plasticized polyamide;

iv) acidifying about 1 to 50% of the aspartate groups of the polyamide of iii);

v) admixing crosslinker with the partially acidified polyamide of iv) under non-crosslinking conditions to form a crosslinkable, uncrosslinked, partially acidified, hydrolyzed, internally plasticized PSI composition;

vi) drawing fibers or forming film from the composition of v); and vii) subjecting the fibers or film to crosslinking conditions to crosslink uncrosslinked aspartate groups and form the superabsorbing fibers or film.

DETAILED DESCRIPTION OF THE INVENTION

Synthetic superabsorbing polymer fibers and films of the invention are derived from L-aspartic acid starting monomer available commercially from Solutia Inc. L-aspartic acid is conventionally condensation polymerized in the presence of catalyst such as phosphoric acid. Processes for preparing homopolymer polysuccinimide (PSI) are described in U.S. Pat. Nos. 5,057,597; 5,315,010 and 5,319,145. Molecular weight (weight average $M_w$) is preferably at least 20,000 and more preferably at least 30,000 up to or about 100,000 Daltons. Such relatively high molecular weight is achieved by driving the polycondensation reaction to as complete a level as commercially feasible using catalyst concentrations, reaction temperature and time at the high end of the ranges disclosed in these patents. Water of condensation is removed as it is formed as taught in U.S. Pat. No. 5,484,945 (Nagatomo et al) the disclosure in which is incorporated herein by reference. In a preferred procedure, polycondensation is conducted at reduced pressure and 180° C. in the presence of 85% phosphoric acid as described in U.S. Pat. No. 5,142,062 (Knebel et al) the disclosure of which is also incorporated herein by reference. Succinimide ("S") groups of formula (2) are the repeating structural unit.

To permit formation of fibers or films from the composition (as will be later described), S groups of the PSI are next ring-opening reacted with one or more monoamine compounds having the formula $HNR_1R_2$ in an amount functionally effective to internally plasticize the PSI and form a poly(imide-co-amide) intermediate. $R_1$ represents a hydrogen atom or an alkyl or alkenyl group of 1 to 55 carbon atoms, preferably 1–30, which can be straight chain or branched and unsubstituted or substituted, and $R_2$ represents a hydrogen atom, —OH, an alkyl or alkenyl group of 1 to 55 carbon atoms, preferably 1–30, which can be straight chain or branched and unsubstituted or substituted. The alkyl or alkenyl groups of $R_1$ and $R_2$ optionally contain one or more oxygen atoms. Optional substituents of the alkyl or alkenyl groups of $R_1$ and $R_2$ are common organic functional groups not interfering with the hydrolysis, acidification or crosslinking reactions of the invention such as one of the following: hydroxyl (—OH), ether (—$OR_3$), chloride (—Cl) and ketone (—$COR_3$), wherein $R_3$ represents an alkyl or alkenyl group of 1 to 8 carbon atoms. Currently preferred substituents of the invention are —OH and —$OR_3$.

The amount of monoamine compound in the poly(imide-co-amide) is that amount necessary to achieve adequate internal plasticization of the PSI and varies with the specific monoamine chosen. The amount of monoamine necessary is readily determined by one of ordinary skill and is based on the properties of the specific monoamine, e.g. molecular weight. Using diethanolamine as the monoamine, the repeating structural unit is represented by formula (1) in combination with S groups of formula (2), the mole fraction of repeating structural units represented by formula (1) being about 0.01 to about 0.20. The internal plasticizer softens and provides the polymer with fiber- and film-forming properties. Any compound containing one functional amino group which is reactable with PSI can be used to form the poly(imide-co-amide) intermediate and provide the internal plasticizing function. Compounds with two or more reactable amino groups tend to lead to crosslinking and therefore should be avoided. Other monoamino compounds interchangeably usable with the diethanolamine of the Example following illustratively include, but are not limited to, methylamine, ethylamine, propylamine, butylamine, pentylamine, hexylamine, O—(2-Aminopropyl)—O'—(2-methoxyethyl)polypropylene glycol 500 (Jeffamine® M-600), ethanolamine, neopentanolamine, 3-isononyloxypropylamine, 3-propanolamine, 2-methoxy-ethylamine, 3-methoxy-propylamine, 3-ethoxypropyl-amine, ethylhexoxy-propylamine, isopropanolamine, and diisopropanol-amine. Monoamine is reacted with PSI in a solvent mixture at a temperature adequate for succinimide ring-opening which is typically about 40 to 70° C. Suitable solvents for the succinimide ring-opening reaction are water, polar organic solvents such as dimethylformamide (DMF), dimethylsulfoxide, and N-methyl-2-pyrrolidone (NMP), and non-polar organic solvents such as toluene and hexane. The preferred solvent for the succinimide ring-opening reaction are water and polar organic solvents, with water being the most preferred solvent. Using diethanolamine the reaction is illustrated as follows:

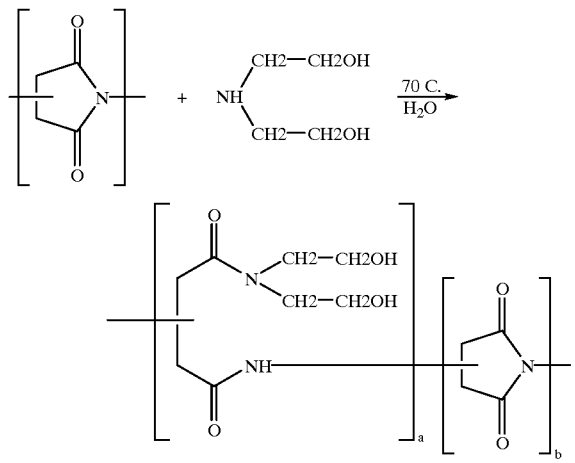

wherein a and b represent the mole fractions of the respective repeating structural units, and a is 0.01 to 0.20 and b is 0.99 to 0.80.

Internally plasticized PSI or poly(imide-co-amide) is next hydrolyzed with a regulated amount of base sufficient to form salt from essentially all of the S groups of the poly (imide-co-amide) to form an internally plasticized polyamide. As used herein, the term ▩ essentially all▩ means>about 99%. The repeating unit of hydrolyzed succinimide, i.e. aspartate, has the following structure:

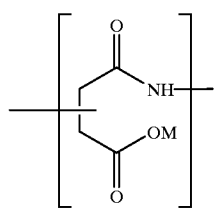

where M is an alkali metal cation such as $Na^+$, $K^+$, $Li^+$, ammonium or quaternary ammonium. This hydrolysis is accomplished by reacting the poly(imide-co-amide) reaction product of the prior process step with a suitable base, e.g. alkali metal hydroxide, ammonium hydroxide, and the like, in a suitable solvent selected from water, polar organic solvents such as DMF, DMSO and NMP, non-polar organic solvents such as toluene and hexane, and mixtures thereof. The currently preferred solvent is water and the currently preferred base is sodium hydroxide. In a preferred embodiment, this hydrolysis is conveniently accomplished by adding aqueous base solution in situ to the poly(imide-co-amide) reaction product of the prior process step. In the preferred embodiment, the hydrolyzed, internally plasticized PSI composition is totally dissolved in water solution after completion of the hydrolysis. Hydrolysis occurs at room temperature or, to reduce reaction time at elevated hydrolysis temperature typically up to about 75° C., until essentially all of the S groups are hydrolyzed.

The hydrolyzed, internally plasticized PSI composition, i.e. the internally plasticized polyamide, is next partially acidified with a regulated amount of an acid sufficient to convert about 1 to 50% of the aspartate groups into the acid form, i.e. acidified aspartate groups, for use in the crosslinking reaction. The amount of acid to partially acidify the hydrolyzed, internally plasticized polyamide is that amount necessary to reduce the pH to less than about 6.5, preferably from about 4 to about 6. The repeating unit of acidified aspartate has the following structure:

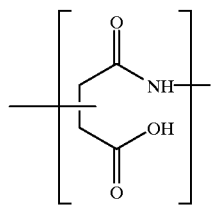

This partial acidification is accomplished by reacting the internally plasticized polyamide reaction product of the prior process step with a suitable acid in a suitable solvent selected from water, polar organic solvents such as DMF, DMSO and NMP, non-polar organic solvents such as toluene and hexane, and mixtures thereof. Suitable acids are acids that are capable of achieving a pH of less than 5 in the partial acidification reaction mixture and include mineral acids, e.g. hydrochloric acid, nitric acid, sulfuric acid, phosphoric acid and the like, and organic acids, e.g. carboxylic acids. The currently preferred solvent is water and the currently preferred acid is hydrochloric acid.

Crosslinker for eventually crosslinking acidified or non-acidified aspartate groups is then admixed under non-crosslinking conditions into the solution of partially acidified, hydrolyzed, internally plasticized PSI to form a crosslinkable, uncrosslinked, partially acidified, hydrolyzed, internally plasticized, PSI composition. The crosslinker can be admixed with the solution of partially acidified, hydrolyzed, internally plasticized PSI before or after concentration of the solution. In the preferred embodiment, crosslinker is admixed under non-crosslinking conditions into an aqueous solution of partially acidified, hydrolyzed, internally plasticized PSI to form a crosslinkable, uncrosslinked, partially acidified, hydrolyzed, internally plasticized PSI composition. According to the invention, crosslinking is delayed until after fiber or film formation, but crosslinker is added before fiber or film formation to insure that the crosslinker is evenly distributed throughout the partially acidified, hydrolyzed, internally plasticized PSI solution. Adding crosslinker to the solution while minimizing or avoiding crosslinking is accomplished by doing so at or about room temperature (22–25° C.) down to or about 0° C. This relatively low temperature protects against premature crosslinking before fiber or film formation and can vary with the crosslinking activity, or reactivity, of the crosslinker. Such non-crosslinking temperature conditions are chosen to avoid significant development of gel which occurs when crosslinked polyaspartate salt absorbs solvent, e.g. water, from the solution. Such gel should be avoided since fibers cannot effectively be drawn nor films effectively formed from a gel-containing partially acidified, hydrolyzed, internally plasticized PSI composition.

Suitable crosslinkers for the partially acidified, hydrolyzed, internally plasticized PSI composition according to the invention are any suitable polyfunctional compound having two or more functional groups that will react with the carboxylate groups of at least two of the aspartate groups at the pH conditions of the crosslinking reaction. Suitable crosslinkers include, but are not limited to, polyepoxides, haloepoxides (particularly chloroepoxides such as epichlorohydrin), polyaziridines, polyoxazolines, and mixtures thereof. As used herein, polyepoxides include compounds having two or more epoxide groups, e.g. diepoxides, triepoxides, and tetraepoxides. As used herein, haloepoxides include compounds having two or more functional groups wherein at least one functional group is an epoxide group and at least one functional group is a halogen. As used herein, polyaziridines include compounds having two or more aziridine groups and polyoxazolines include compounds having two or more oxazoline groups. Suitable polyepoxide crosslinkers of the invention include, but are not limited to, those represented by the formula:

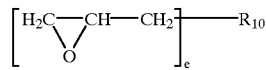

wherein "e" is 2 to 6, and $R_{10}$ is selected from a linear or branched aliphatic radical having 2 to 30 carbon atoms, an alicyclic radical having 3 to 18 carbon atoms, or an aromatic radical having 6 to 26 carbon, wherein the radicals optionally contain one or more oxygen atoms. The $R_{10}$ radical will have a valency equal to "e". As used herein, the term "aromatic" includes, but is not limited to, groups such as phenyl, naphthyl, pyridyl and the like in which the ring may be substituted by groups which do not interfere with the crosslinking reaction such as, but not limited to, $C_1$ to $C_6$ alkyl, nitro, halo, $C_1$ to $C_{12}$ alkoxy and the like. As used herein, the aliphatic and alicyclic groups are optionally substituted by groups which do not interfere with the crosslinking reaction such as, but not limited to, nitro, halo, hydroxy, $C_1$ to $C_{12}$ alkoxy and the like. When "e" is 2, the linear or branched aliphatic radicals preferably have 2 to 14 carbon atoms and the alicyclic radicals preferably have 3 to 12 carbon atoms. When "e" is 3, the linear or branched aliphatic radicals preferably have 3 to 18 carbon atoms and the alicyclic radicals preferably have 4 to 12 carbon atoms. When "e" is 4, the linear or branched aliphatic radicals preferably have 5 to 30 carbon atoms and the alicyclic radicals preferably have 5 to 18 carbon atoms. When "e" is 5, the linear or branched aliphatic radicals preferably have 6 to 30 carbon atoms and the alicyclic radicals preferably have 6 to 18 carbon atoms. When "e" is 6, the linear or branched aliphatic radicals preferably have 8 to 30 carbon atoms and the alicyclic radicals preferably have 8 to 18 carbon atoms.

Examples of polyepoxides for use in the invention include, but are not limited to, ethylene glycol diglycidyl ether, 1,4-cyclohexane dimethanol diglycidyl ether, diglycidyl 1,2-cyclohexane dicarboxylate, N,N-diglycidyl-4-glycidyloxyaniline, and 4,4'-methylenebis(N,N-diglycidylaniline).

The polyepoxides of the invention are readily available or can be prepared by processes known in the art, such as by epoxidation of polyolefin with peracid.

Suitable polyaziridine crosslinkers of the invention include, but are not limited to, those represented by the formula:

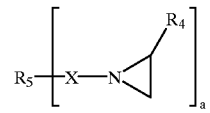

wherein $R_4$ is an alkyl group having 1 to 10 carbon atoms which is optionally substituted by groups which do not interfere with the crosslinking reaction such as, but not limited to, nitro, halo, hydroxy, $C_1$ to $C_{12}$ alkoxy and the like; $R_5$ is an aliphatic radical having 1 to 30 carbon atoms or a direct bond; X is an alkylene group having 1 to 30 carbon atoms, optionally containing an ester group, an ether group, an amide group or a similar inert group; and "a" is 2 to 4. Preferred polyaziridines are those in which $R_4$ is methyl, ethyl, propyl or butyl, X is represented by the formula

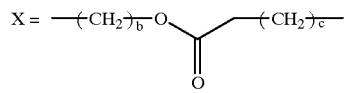

wherein b is 1 to 3 and c is 1 to 3, a is 2 to 3, and $R_5$ is a propylene radical.

Examples of polyaziridines for use in the invention include, but are not limited to, trimethylolpropane tris[(β-N-aziridinyl)propionate], and pentaerythritol tris[(β-N-aziridinyl)propionate].

The polyaziridines of the invention can be prepared by processes known in the art such as by dehydration of α-amino hydroxyl compounds.

Suitable polyoxazoline crosslinkers of the invention include, but are not limited to, those represented by the formula:

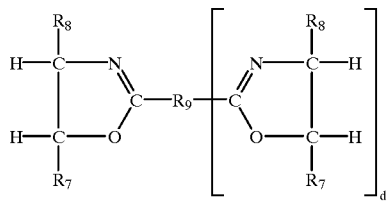

wherein $R_7$ and $R_8$, which may be the same or different, represent hydrogen, an alkyl radical having 1 to 8 carbon atoms or an aryl radical having 6 to 12 carbon atoms; $R_9$ represents a polyfunctional, more particularly difunctional, alkylene radical having 1 to 20 carbon atoms, preferably 1 to 12 carbon atoms, or an arylene radical having 6 to 12 carbon atoms; and d is 1 to 3.

Examples of polyoxazolines for use in the invention include, but are not limited to, ethylenebis(2-oxazoline), 1,2,4-tris(2-oxazoline) butane, and 2,2'-methylenebis[(4S)-4-phenyl-2-oxazoline].

The polyoxazolines of the invention are prepared by processes known in the art.

The crosslinker is preferably used in anhydrous (neat), undiluted, virgin form as a solid or liquid, but alternatively can be a component of a dilute or concentrated solution, dispersion or suspension. A currently preferred crosslinker is ethyleneglycol diglycidyl ether. The amount of crosslinker according to the invention is that amount which is sufficient to crosslink a portion of the acidified or non-acidified aspartate groups of the polyamide precursor corresponding to about 1 to about 30%, preferably about 1 to about 15%, of the S groups in the initial homopolymer PSI. The preferred amount of crosslinker will depend on the specific crosslinker used. The acidified or non-acidified aspartate groups crosslinked during curing comprise from about 1 to about 30%, preferably about 1 to about 15%, of the total succinimide groups originally present in the PSI. This amount and the resulting eventual level of crosslinking renders the polymer of the fibers or film superabsorbing in being capable of absorbing from at least 3 times to more than 100 times their weight of water. Though not wishing to be bound to any particular structure, it is believed the crosslinking agent exists as an unreacted component in the uncrosslinked composition which may be intimately admixed with the balance of the components of the composition, or at most is chemically reacted via one functional group of the crosslinker to one carboxylate group of an aspartate group but not to two which would create a crosslink undesirably leading to gel formation.

At this stage a partially acidified, hydrolyzed, internally plasticized, crosslinkable, uncrosslinked PSI composition exists for formation into fibers or film in a manner about to be described which comprises:

i) repeating, internally plasticized structural units represented by formula (3)

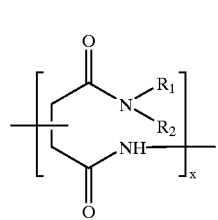

ii) repeating acidified aspartate structural units represented by formula (4)

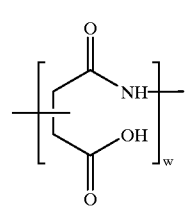

iii) repeating aspartate structural units represented by formula (5)

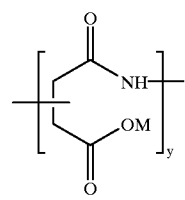

and iv) crosslinking agent, as described herein, capable under crosslinking reaction conditions of crosslinking units of formula (4), wherein M represents alkali metal, ammonium, quaternary ammonium or mixtures thereof, $R_1$ and $R_2$ are as defined above, and x, w and y represent the mole fractions of structural units (3), (4) and (5) and are respectively about 0.01 to 0.20; about 0.50 to 0.01 and about 0.40 to 0.90 wherein the sum of x, w and y is 1.0. Optionally, the partially acidifed, hydrolyzed, internally plasticized, crosslinkable, uncrosslinked PSI contains minor amounts of unreacted succinimide repeating units.

For the preparation of fibers, the uncrosslinked solution, which is preferably an aqueous solution, is thickened to about 50% polymer solids concentration and a thin film of this concentrated mixture (solution) manually applied with a spatula or pipette at room (about 22° C.) temperature to the surface of a 2.5×15 cm metal plate. A second plate of equal dimension is pressed against the film on the first plate and as the two plates with the interposed film of concentrated mixture are manually moved apart at a slow rate at room temperature, the film is drawn into single, long, thin, filament-like shapes which are initially joined to each plate but then fracture as the plates move further apart to form elongated, shaped fibers. The unreacted crosslinker present on the polymer fibers is substantially homogeneously distributed. The fibers (which are essentially non-superabsorbing at this stage) are subjected to crosslinking conditions of elevated temperature and time sufficient to cure and crosslink uncrosslinked aspartate groups of the polymer and provide the fibers with superabsorbing capability. An alternative fiber-forming system employing a spinning die to continuously form and then cure fibers according to this invention is described in U.S. Pat. No. 4,855,179 (Bourland et al), the fiber-forming and curing disclosure of which is incorporated herein by reference.

For the preparation of film, the uncrosslinked solution, which is preferably an aqueous solution, can be formed into a film by any conventional film-forming process. For example, the uncrosslinked solution can be thickened, e.g. to about 5% to about 50% polymer solids concentration, preferably about 10% to about 30%, extruded into a gas atmosphere while evaporating the solvent to form the film, the film stretched, and then the film so formed crosslinked. The concentration of the polymer in the uncrosslinked solution is selected, having regard to the molecular weight of the polymer, so as to give a solution having a viscosity that is convenient for extrusion through the extrusion die being used.

In another embodiment, the solution can be deposited upon a support to form a wet film of the solution. The nature of the support is not critical and may be selected from a variety of materials depending on the particular application including, but not limited to, polymeric (e.g. in extruded, film and porous matrix forms), ceramic, glass, or metallic supports. The preferred supports are the polymeric supports, particularly those in porous matrix form. Numerous techniques are available for the application of the solution to the support as will be apparent to those skilled in the art. For example, the polymer solution may be simply poured upon a level support in a quantity sufficient for it to achieve the desired uniform thickness. A blade may then be drawn over the surface of the wet film to aid the deposition of the wet film of uniform thickness. The thickness of the wet film deposited upon the support is determined by the desired thickness of the film ultimately produced. Generally, the wet film is deposited upon the support in a substantially uniform thickness of about 2 to about 30 mils, preferably about 4 to about 10 mils. A quantity of solvent is next evaporated from the exposed surface of the wet film to allow the formation of a relatively thin solid layer of the exposed surface of the film. During the formation of the solid layer of the exposed surface of the film, the solvent present near the surface of the wet film is flashed off and a thin coagulated skin of polymer remains. The evaporation of solvent from the exposed surface of the wet film may be accomplished by a variety of techniques as will be readily apparent to those skilled in the art. For example, a stream of air or other gas at ambient or an elevated temperature below the point at which the polymer in the film will crosslink may be simply directed at the exposed surface of the wet film. The time required to form the desired thin solid layer upon the exposed surface of the wet film commonly ranges from about 30 minutes to about 5 hours, preferably about 30 minutes to about 1 hour. The film is then crosslinked as described herein.

Products of the curing step are partially acidified, hydrolyzed, internally plasticized, crosslinked, superabsorbing fibers or film derived from polysuccinimide. The crosslinked fibers or film are formed of polyamide containing at least three divalent or polyvalent moieties randomly distributed along the polymer chain of the following formulas:

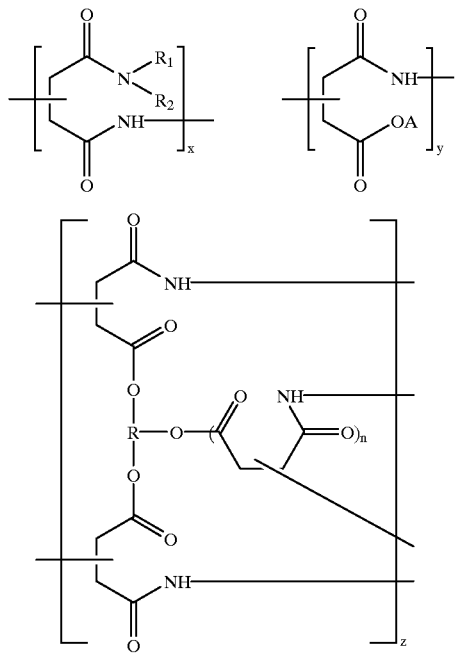

where A represents hydrogen, alkali metal cation, ammonium, quaternary ammonium or mixtures thereof, R represents a divalent or polyvalent crosslinker moiety derived from the crosslinker used, x, y and z represent mole fractions of the moieties in the polyimide and are respectively about 0.01 to 0.20; about 0.40 to 0.90 and about 0.01 to 0.50 wherein the sum of x, y and z is 1.0, and n is an integer from 0 to 4. $R_1$ and $R_2$ are substituents on the monoamine compound used for the internal plasticization of PSI and can be the same or different. Optionally, the superabsorbent polymer contains minor amounts of unreacted succinimide repeating units, i.e. repeating unit disclosed in formula (2) above, and unreacted acidified aspartate repeating units, i.e. repeating unit disclosed in formula (4) above.

The superabsorbent fibers and film of the invention are useful in the manufacture of moisture absorbent articles, such as disposable diapers, sanitary napkins, incontinence garments, bandages, absorbent liners in meat packing trays, pet tray liners, and the like. The superabsorbent fibers and film of the invention are particularly useful in the manufacture of thin or ultra-thin disposable diapers which have excellent moisture absorbance capacity, fluid distribution properties and reduced leakage. The superabsorbent fibers of the invention are also useful directly or in non-woven sheet or matting form for agricultural or gardening materials such as water-holding materials for soils, e.g. mixing the fibers directly with soil. The superabsorbent films of the invention are also useful directly or attached to a porous matrix for agricultural or gardening materials such as water-holding materials for soils. The sheet or matting form can also be used for seedlings and landscaping applications.

In making absorbent articles with the superabsorbent fibers of the invention, the fibers may be mixed with, attached to, layered in, or dispersed in a porous matrix of fibers. In one embodiment, the superabsorbent fibers of the invention are combined with other fibers to form a non-woven material. The superabsorbent fibers of the invention can be combined with hydrophilic fibers such as cellulose pulp or fluff, cotton liners, and synthetic fibers or a mixture of the fibers and the cellulose fluff. The fibers can be loose or joined as in nonwovens. Suitable synthetic fibers include, but are not limited to, polyesters, copolymers of polyesters and polyamides, polyvinyl alcohol and the like. The synthetic fibers may be meltblown fibers or fibers which have been treated to render them hydrophilic. Additionally, the superabsorbent fibers of the invention may be incorporated in the absorbent article in a compartment or localized area in the absorbent structure.

In making absorbent articles with the superabsorbent films of the invention, the films may be attached to or layered in a porous matrix of fibers or a porous film. The superabsorbent films of the invention can be combined with hydrophilic fiber matrices comprising cellulose pulp or fluff, cotton liners, and synthetic fibers or a mixture of the fibers and the cellulose fluff. Suitable synthetic fibers include, but are not limited to, polyesters, copolymers of polyesters and polyamides, polyvinyl alcohol and the like. The synthetic fibers may be meltblown fibers or fibers which have been treated to render them hydrophilic. Additionally, the superabsorbent films of the invention may be incorporated in the absorbent article in a compartment or localized area in the absorbent structure.

Absorbent articles for use in hygienic and sanitary products, such as disposable diapers, are made with a liquid-impermeable backing material, a liquid-permeable bodyside facing material and the liquid-absorbing material sandwiched between the backing material and the facing material. The liquid-impermeable backing material can be made from commercially available polyolefin film and the liquid-permeable facing material can be made from a commercially available nonwoven material, such as spunbonded or corded fibrous web which is wettable and capable of passing the fluid to be absorbed, e.g. urine.

The absorbent articles of the invention may comprise about 5% to about 90% by weight, preferably about 20% to about 70% by weight, of the superabsorbent fibers or film of the invention. In an absorbent article, where the superabsorbent fibers of the invention are utilized with other fibers in a matrix, such as a nonwoven material, or where the superabsorbent films are utilized in a matrix, the superabsorbent fiber or film of the invention is present in an amount from about 30 to about 70 weight percent of the total matrix. In another form of absorbent article, the superabsorbent fiber or film may be present in a containment structure in which the superabsorbent fiber or film of the invention is present in an amount of about 30 to about 90 percent by weight.

EXAMPLES

The invention is further described in the following Examples which is not intended to limit or restrict the invention. Unless otherwise indicated all quantities are expressed in weight.

The tea bag test measuring superabsorbence referred to in the Example is conducted as follows: about 0.2 gm of a sample is placed in a tea bag-like pouch (2"×2") of nonwoven fabric and stapled. The tea bag is subjected to a 15 second immersion in a 0.9% saline solution, one minute drip dry and weighing, followed by a 2 min. 45 sec. immersion, one min. drip dry and weighing, and then an additional 7 min. immersion, one min. drip dry and weighing. The absorbencies for 15 seconds, 3 minutes and 10 minutes are calculated according to the following equation and the 10 min. value reported as superabsorbing performance. Absorbency in gm/gm=(weight of the tea bag with treated sample minus weight of the wet tea bag minus weight of the untreated sample)/weight of the untreated sample.

Example 1

Preparation of Sample Number 1:

Into a round bottom flask was added 1 gm (10.3 mmol) polysuccinimide (MW=97,000 daltons by GPC), 0.06 gm (0.98 mmol) ethanolamine and 30 gm of water. The mixture was stirred at 50° C. for 2 hours and 3.6 ml (9.00 mmol) of 10% (by w/v) NaOH solution was added and was cooked for another 2 hours. After the reaction mixture was cooled to room temperature, 1.10 ml (1.81 mmol) of 5.83% HCl (by w/w) was slowly added to reaction mixture to pH=5.5. The reaction mixture was stirred at room temperature for another 2 hr. The undissolved particles were removed by filtration. The filtrate was concentrated and the resultant thick solution (about 50% solids) was admixed with 0.15 gm (0.43 mmol) of a 50% aqueous ethylene glycol diglycidyl ether. The solution was stirred at room temperature overnight. Then a thin film of the above mixture was applied between two metal plates. Fibers were formed as the two plates were drawn apart from each other. Such fibers were heated in an oven at about 140° C. for 30 min. to complete the crosslinking. Samples of the final product were taken for the standard teabag test for absorbency in water and saline solution. One gram of this SAP fiber can absorb 109 grams of water and about 45 grams of saline solution.

Preparation of Sample Numbers 2–6:

Subsequent runs were made using the above procedure, except that the amount of the diepoxide crosslinking agent employed was varied as listed in Table 1.

TABLE 1

| Sample Number | Crosslinker Amount (mmol) | Absorbency[1] in Saline (0.9%) | | |
|---|---|---|---|---|
| | | 15 Sec | 3 min | 10 min |
| 1 | 0.43 | 41.4 | 43.8 | 45.4 |
| 2 | 0.17 | 37.2 | 37.2 | 38.7 |
| 3 | 0.066 | 15.6 | 17.3 | 18.8 |
| 4 | 0.12 | 19.1 | 19.8 | 20.8 |
| 5 | 0.24 | 24.9 | 26.3 | 27.8 |
| 6 | 0.52 | 38.5 | 40.1 | 42.6 |

[1]Absorbency in grams liquid per gram dry sample.

Preparation of Sample Numbers 7–10:

Subsequent runs were made using the above procedure, except that the curing temperature employed was varied as listed in Table 2.

TABLE 2

| Sample Number | Curing Temperature (° C.) | Absorbency[1] in Saline (0.9%) | | |
|---|---|---|---|---|
| | | 15 Sec | 3 min | 10 min |
| 7 | 100 | 36.6 | 37.8 | 38.8 |
| 8 | 120 | 37.5 | 39.1 | 39.1 |
| 9 | 160 | 37.3 | 39.0 | 40.3 |
| 10 | 180 | 32.6 | 32.4 | 32.8 |

[1]Absorbency in grams liquid per gram dry sample.

Preparation of Sample Numbers 11–15:

Subsequent runs were made using the above procedure, except that the amount of diepoxide crosslinking agent employed was 0.085 gms (0.24 mmol) and the curing time employed was varied as listed in Table 3.

TABLE 3

| Sample Number | Curing time (min) (° C.) | Absorbency[1] in Saline (0.9%) | | |
|---|---|---|---|---|
| | | 15 Sec | 3 min | 10 min |
| 11 | 10 | 38.0 | 39.1 | 41.4 |
| 12 | 20 | 40.2 | 42.5 | 43.5 |
| 13 | 40 | 38.0 | 39.1 | 41.4 |
| 14 | 60 | 38.5 | 40.1 | 42.6 |
| 15 | 90 | 34.4 | 36.1 | 36.5 |

[1]Absorbency in grams liquid per gram dry sample.

Preparation of Sample Numbers 16–19:

Subsequent runs were made using the above procedure, except that the amount of diepoxide crosslinking agent employed was 0.12 gms (0.34 mmol) and the molecular weight (Mw) of the polysuccinimide employed was varied as listed in Table 4.

TABLE 4

| Sample Number | Polysuccin- imide, Mw | Absorbency[1] in Saline (0.9%) | | |
|---|---|---|---|---|
| | | 15 Sec | 3 min | 10 min |
| 16 | 13,000 | 8 | 8.8 | 8.6 |
| 17 | 33,000 | 28.2 | 31.5 | 33 |
| 18 | 51,000 | 36.9 | 39.1 | 41.2 |
| 19 | 97,000 | 37.2 | 39.2 | 41.8 |

[1]Absorbency in grams liquid per gram dry sample.

Preparation of Sample Number 20:

Into a round bottom flask was added 1 gm (10.3 mmol) polysuccinimide (MW=97,000 daltons by GPC), 0.125 gm (1.96 mmol) ethanolamine and 30 gm of water. The mixture was stirred at 50° C. for 2 hours and 3.3 ml (8.25 mmol) of 10% (by w/v) NaOH solution was added and was cooked for another 2 hours. After the reaction mixture was cooled to room temperature, 1.10 ml (1.81 mmol) of 5.83% HCl (by w/w) was slowly added to the reaction mixture to pH=5.5. The reaction mixture was stirred at room temperature for another 2 hr. The undissolved particles were removed by filtration. The filtrate was concentrated and the resultant thick solution (about 50% solids) was admixed with 0.18 gm (0.52 mmol) of a 50% aqueous ethylene glycol diglycidyl ether. The solution was stirred at room temperature overnight. Then a thin film of the above mixture was then applied between two metal plates. Fibers were formed as the two plates were drawn apart from each other. Such fibers were heated in an oven at about 140° C. for 30 min. to complete the crosslinking. Samples of the final product were taken for the standard teabag test for absorbency in water and saline solution. One gram of this SAP fiber can absorb about 29 grams of saline solution.

Example 2

This example suggests that the fibers prepared according to Example 1 are biodegradable.

Superabsorbent fiber reported as sample number 20 in Example 1 above were tested to determine its biodegradability.

The following experimental procedure was utilized to determine the biodegradability of the superabsorbent fiber samples.

1. Weighed out approximately 25 grams of Drummer soil (a silt loam soil having 18% sand, 62% silt and 20% clay with pH (1:1 soil:H$_2$O) of 6.7 and % organic carbon of 1.80) which had been passed through a #12 sieve into each of 12 soil biodegradation flasks.
2. Added aliquot of sample into appropriate flask.
3. Added 25 mL of deionized water to each flask.
4. Placed a vial containing 10 mL of 0.3 N barium hydroxide into side chamber in each soil biodegradation test flask.
5. Purged each test flask with air containing 70% oxygen and 30% nitrogen.
6. Stoppered flasks with silicone stoppers.
7. Placed flasks on rotary shaker. Rotary shaker was enclosed so that light cannot enter.
8. At selected time intervals removed barium hydroxide traps and replaced with fresh barium hydroxide and again purged units with 70% oxygen:30% nitrogen air and stopper.
9. Barium hydroxide removed from test flasks was titrated with hydrochloric acid. The total amount of carbon dioxide yielded was calculated. The amount of carbon dioxide yielded from blank soils is subtracted from total to calculate amount of carbon dioxide yielded due to sample.

The greater the $CO_2$ yielded as % of theoretical, the greater the biodegradability of the sample.

The results are shown in Table 5.

TABLE 5

| $CO_2$ Yield as % of Theoretical | | | | | | | |
|---|---|---|---|---|---|---|---|
| Days | 6 | 13 | 21 | 28 | 36 | 41 | 47 |
| $CO_2$ % of theory | 8 | 12 | 16 | 19 | 23 | 25 | 28 |

Example 3

5 gm (51.5 mmol)polysuccinimide (MW=65,000 daltons by GPC), 0.31 gm (5.15 mmol) ethanolamine and 80 gm of water are added to a round bottom flask. The mixture is stirred at 50° C. for 2 hours and 18.6 ml of 10% (by w/v) NaOH solution (46.35 mmol) added and held for another 2 hours at 50° C. After the reaction mixture was cooled to room temperature, 3.60 ml (5.92 mmol) of 5.83% HCl (by w/w) was slowly added to reaction mixture to pH=5.5. The reaction mixture was stirred at room temperature for another 2 hr. The undissolved particles were removed by filtration. The filtrate was concentrated and the resultant thick solution (about 20% solids) was admixed with 0.15 gm (1.33 mmol) of a 50% aqueous ethylene glycol diglycidyl ether. The solution was stirred at room temperature overnight. The above mixture was then cast on glass plates and put into 60° C. oven overnight. The films are then after-treated in an oven at elevated temperature of 140° C. for 45 minutes to crosslink the composition of the films. Samples of the partially hydrolyzed, internally plasticized, crosslinked, superabsorbing films derived from polysuccinimides are subjected to the tea bag test for absorbency. One gram of film absorbs about 13 grams of saline solution.

Other aspects of the invention are defined as follows.

A process for preparing superabsorbing fibers or film which comprises: i) drawing fibers or forming film from an internally plasticized, partially acidified, hydrolyzed, crosslinkable, uncrosslinked polysuccinimide (PSI) composition; and ii) curing the fibers or film to crosslink aspartate groups of the PSI composition of i) to render the fibers or film superabsorbent. The aspartate groups crosslinked during curing correspond to about 1 to about 30% of total succinimide groups originally present in the PSI.

A process for rendering polymer fibers or film superabsorbent which comprises curing fibers or film of an internally plasticized, partially acidified, hydrolyzed, crosslinkable, uncrosslinked PSI composition to crosslink the composition.

In a composition capable of forming fibers or film containing a fiber- or film-formable polymer, the improvement wherein the polymer is a partially acidified, hydrolyzed, internally plasticized, crosslinkable, uncrosslinked polysuccinimide.

A process for forming a partially acidified, hydrolyzed, internally plasticized polyamide which comprises (a) reacting polysuccinimide with about 1 to about 20 mole percent of a monoamine having the formula $HNR_1R_2$ to produce a poly(imide-co-amide); wherein $R_1$ is a hydrogen atom or an alkyl or alkenyl group of 1 to 55 carbon atoms which can be straight chain or branched and unsubstituted or substituted, and $R_2$ is a hydrogen atom, —OH, or an alkyl or alkenyl group of 1 to 55 carbon atoms which can be straight chain or branched and unsubstituted or substituted; wherein the alkyl or alkenyl groups of $R_1$ and $R_2$ optionally contain one or more oxygen atoms; and wherein the optional substituents of the alkyl or alkenyl groups of $R_1$ and $R_2$ are selected from hydroxyl, ether, chloride or ketone; (b) reacting the poly(imide-co-amide) of step (a) with a suitable base to hydrolyze essentially all of the succinimide groups of the poly(imide-co-amide) of step (a) to produce an internally plasticized, hydrolyzed polyamide; and (c) reacting the polyamide of step (b) with a suitable acid to acidify about 1 to 50% of the aspartate groups of the polyamide of step (b). As used herein, about 1 to about 20 mole percent of a monoamine is based on the number of moles of succinimide repeating units in the polysuccinimide, i.e. the mole ratio of monoamine to succinimide repeating units is about 0.01 to about 0.2. In a further embodiment, the partially acidified, hydrolyzed, internally plasticized polyamide of step (c) is contacted with a crosslinker under non-crosslinking conditions to form a partially acidified, hydrolyzed, internally plasticized, crosslinkable polyamide.

The invention is a marked departure from the level of ordinary skill in the art by providing PSI derivatives in superabsorbing fiber or film form usable alone or in combination with other components (including fibers) in superabsorbing applications.

The preceding description is for illustration and should not be taken as limiting. Various modifications and alterations will be readily suggested to persons skilled in the art. It is intended, therefore, that the foregoing be considered as exemplary only and that the scope of the invention be ascertained from the following claims.

We claim:

1. A process for preparing superabsorbing polyamide film comprising:
   i) reacting about 1 to 20% of the succinimide groups of a polysuccinimide (PSI) with one or more monoamines to form an internally plasticized poly(imide-co-amide) intermediate;
   ii) hydrolyzing essentially all of the succinimide groups of the poly(imide-co-amide) intermediate of i) to form an internally plasticized polyamide;
   iii) acidifying about 1 to 50% of the hydrolyzed succinimide groups of the polyamide of ii);
   iv) admixing crosslinker with the partially acidified polyamide of iii) under non-crosslinking conditions to form a crosslinkable, uncrosslinked, partially acidified, hydrolyzed, internally plasticized PSI composition;
   v) forming film from the composition of iv); and
   vi) subjecting the film to crosslinking conditions to crosslink a portion of uncrosslinked groups and form the superabsorbing polyamide film.

2. The process of claim 1 wherein the starting polysuccinimide has a weight average molecular weight of at least about 20,000 Daltons.

3. The process of claim 2 wherein the polysuccinimide of i) is prepared by condensation polymerizing L-aspartic acid.

4. The process of claim 1 wherein the groups crosslinked in step vi) comprise about 1 to about 50% of the total succinimide groups present in the starting PSI.

5. The process of claim 1 wherein said crosslinker is selected from polyepoxides, haloepoxides, polyaziridines, polyoxazolines, or mixtures thereof.

6. A process for preparing superabsorbing polyamide film which comprises:
   i) forming film from an internally plasticized, partially acidified, hydrolyzed, crosslinkable, uncrosslinked polysuccinimide (PSI) composition; and
   ii) curing the film to crosslink the uncrosslinked groups of the PSI composition of i) to render the film superabsorbent.

7. The process of claim 6 wherein the crosslinked in step ii) correspond to about 1 to about 50% of the total succinimide groups present in the PSI prior to internal plasticization and hydrolysis.

8. Partially acidified, hydrolyzed, internally plasticized, crosslinked, superabsorbing film derived from polysuccinimide.

9. The fibers or claim 8 comprising a polyamide having at least three divalent or polyvalent moieties randomly distributed along the polymer chain having the following formulas:

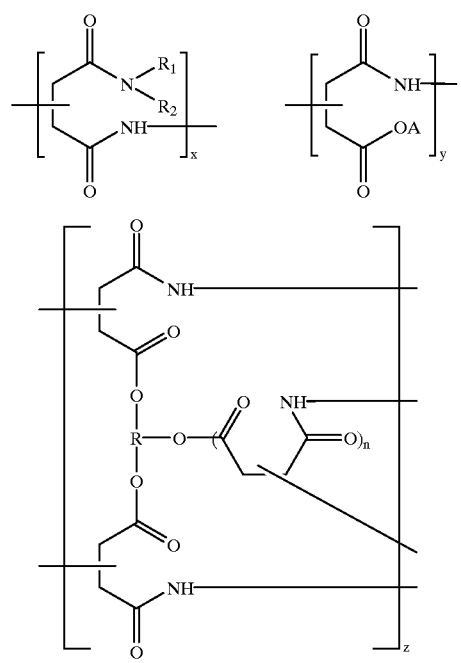

wherein A represents hydrogen, an alkali metal cation, ammonium, quaternary ammonium or mixtures thereof, R represents a divalent or polyvalent crosslinker moiety, x, y and z represent mole fractions of the moieties in the polyamide and are respectively about 0.01 to 0.20; about 0.40 to 0.90 and about 0.01 to 0.50 wherein the sum of x, y and z is 1.0, and n is an integer from 0 to 4; wherein $R_1$ represents a hydrogen atom or an alkyl or alkenyl group of 1 to 55 carbon atoms which can be straight chain or branched and unsubstituted or substituted, and $R_2$ represents a hydrogen atom, —OH, an alkyl or alkenyl group of 1 to 55 carbon atoms which can be straight chain or branched and unsubstituted or substituted; wherein the alkyl or alkenyl groups of $R_1$ and $R_2$ optionally contain one or more oxygen atoms, and are optionally substituted with common organic functional groups selected from hydroxyl, ether, chloride or ketone.

10. A process for preparing superabsorbing polyamide film derived from polysuccinimide (PSI) comprising:

i) forming film from the internally plasticized, partially acidified, hydrolyzed, crosslinkable, uncrosslinked PSI composition of claim 9; and ii) curing the film to crosslink groups of the PSI composition to render the film superabsorbent.

11. The process of claim 10 wherein the aspartate groups crosslinked during curing correspond to about 1 to about 50% of the total succinimide groups originally present in the starting PSI.

12. An absorbent article comprising from about 5 to about 90 percent by weight of a superabsorbent film composition according to claim 8.

13. The absorbent article of claim 12 wherein the absorbent article is a diaper, sanitary napkin, incontinence garment, bandage, meat packing tray absorbent liner, or pet tray liner.

14. An absorbent composition comprising soil and the superabsorbent film composition according to claim 8.

* * * * *